Nov. 9, 1971   R. J. MICHAUD, SR   3,618,464
DUPLICATOR
Filed Dec. 4, 1969   3 Sheets-Sheet 1

ROGER J. MICHAUD, SR.
INVENTOR
BY Peter L. Cantas
Attorney

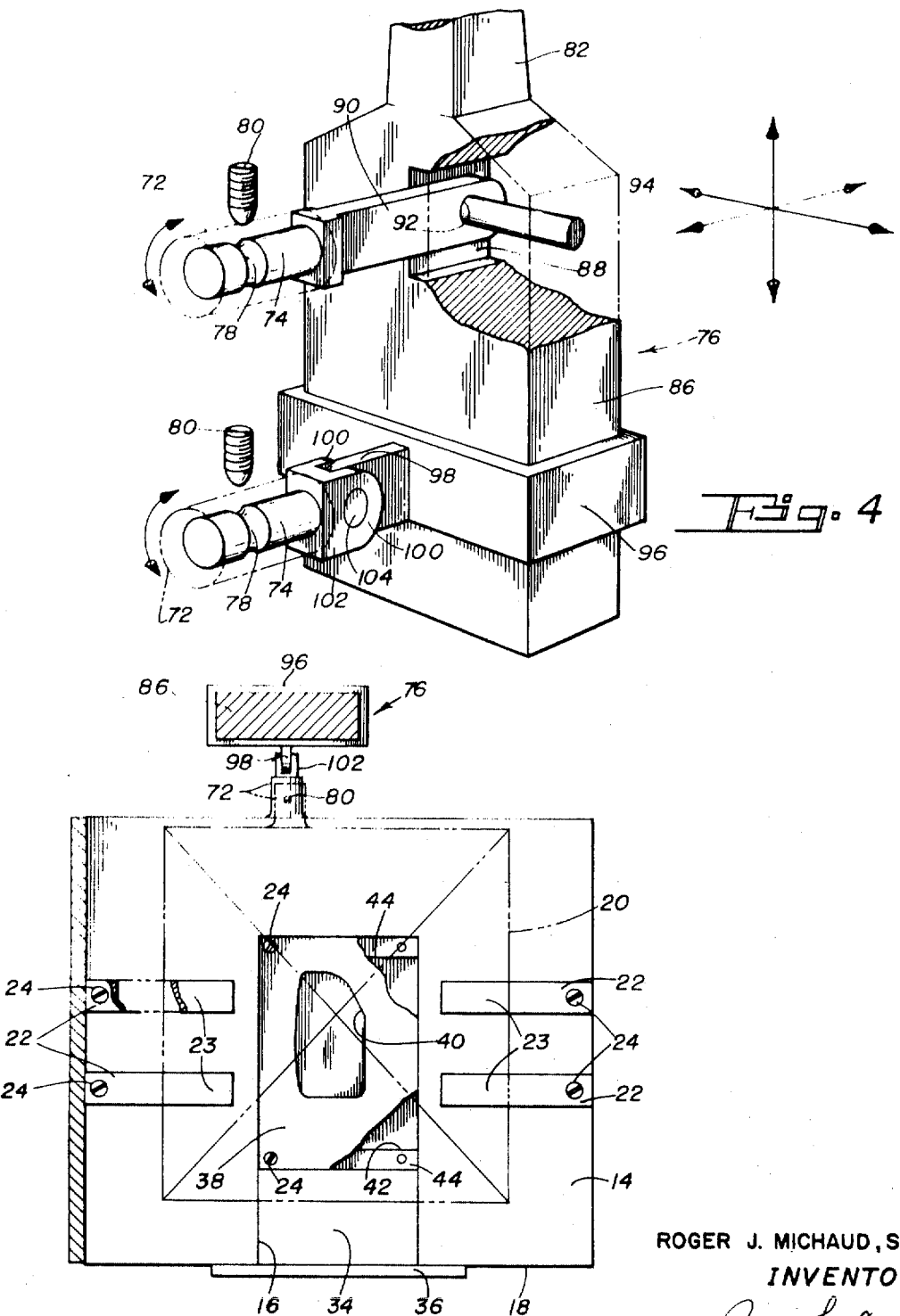

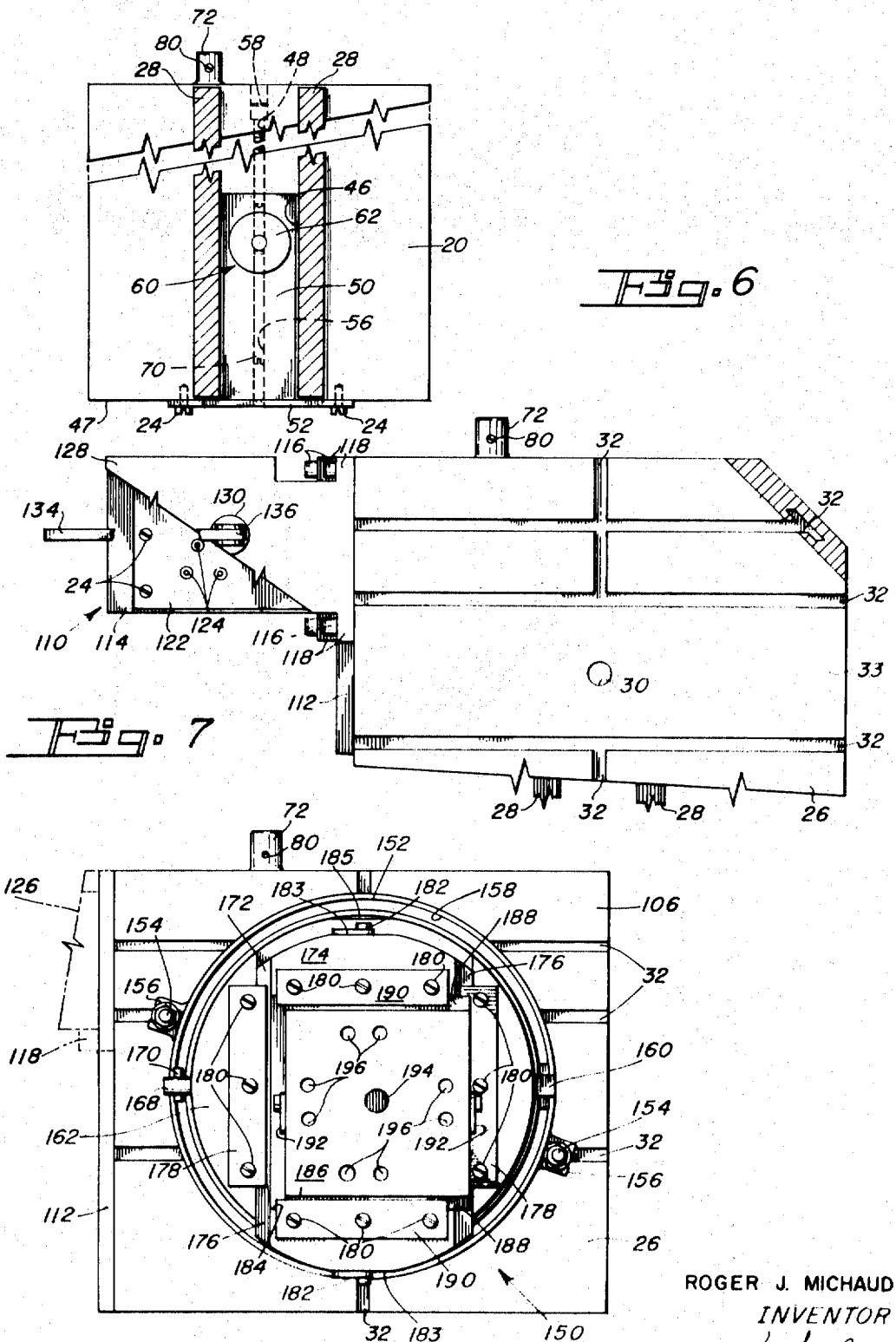

United States Patent Office 3,618,464
Patented Nov. 9, 1971

3,618,464
DUPLICATOR
Roger J. Michaud, Sr., Garden Apartments, Apt. 22-D,
Manchester, Conn. 06040
Filed Dec. 4, 1969, Ser. No. 881,992
Int. Cl. B23d 7/08; B23b 39/06
U.S. Cl. 90—13 R                                        15 Claims

ABSTRACT OF THE DISCLOSURE

Apparatus for pattern copying utilizes a template mounted within a base under a carrier which is movable thereover. The carrier, which has a stylus projecting downwardly into the template, may support a workpiece on its upper surface, and it is restricted against angular and axial movement relative to the base. Both the template and the stylus may be mounted in removable drawers, and the machine may include drilling and universal assemblies, the latter of which permits adjustment of the lateral and angular position of the workpiece mounted upon the carrier.

BACKGROUND OF THE INVENTION

A fundamental problem in machining and tool making operations is the time that must be expended by skilled workers in order to complete a given job. Also, it is quite common for numerous reproductions of a single part to have to be made, which not only requires many hours but is also tedious for the skilled machinist if the reproductions are made individually. A considerable number of tools and devices have been designed for use with basic machines to speed up and simplify such operations in an effort to decrease the number of skilled man-hours required and so as to automate copying to varying degrees. However, in many cases the simpler devices of this type lack sufficient precision or flexibility for widespread use, and the more complex ones tend to require undue amounts of time for setting-up, or necessitate operation by a skilled machinist rather than by a less experienced worker.

Accordingly, it is an object of the present invention to provide a novel apparatus for use in machining operations for the duplication of dies, molds, machine parts and the like, and which apparatus is relatively inexpensive to manufacture, simple to set up and operate, accurate, and highly flexible in its applications.

It is also an object to provide such apparatus including novel subassembly components which improve speed and accuracy, simplify the production of complex parts, and increase the flexibility and scope of utility thereof.

SUMMARY OF THE INVENTION

It has now been found that the foregoing and related objects can be readily attained in apparatus for pattern copying comprising a base having a planar upper surface with an aperture therein and removable means for mounting a template in said base. A pattern template having a surface defining a contour for copying is mounted within the base, with the contour-defining surface being exposed through the aperture in the upper surface of the base. Slidably supported upon the planar upper surface of the base for universal movement thereover in a plane parallel thereto is a carrier member that has a planar bottom surface. Restricting means on the base extends over the base and the carrier member to prevent substantial movement of the carrier member normally outwardly from the base, and angular fixing means on the base and carrier member substantially fix the carrier member against rotation relative and in a plane parallel thereto. A stylus is mounted on the carrier member with one end projecting below the bottom surface thereof and into the aperture in the base member upper surface for contact with the contour-defining surface of the template, and means is provided on the carrier member for rigidly mounting a separable element thereon. The mounted element can be moved in a pattern corresponding to the contour of the template by movement of the carrier member with the stylus bearing against the contour-defining surface thereof to follow the contour.

In a preferred embodiment of the invention the carrier member of the apparatus includes a slide plate seated upon the base, and a counter rigidly attached to the slide plate and spaced thereabove. The counter has a planar top surface extending in a plane parallel to the planar upper surface of the base, and the slide plate provides the planar bottom surface of the carrier member. The stylus is mounted on and extends through the slide plate and the top surface of the counter desirably has a plurality of slots and a recess formed therein. The slots provide the mounting means on the carrier member, and the recess is axially aligned with the stylus to provide means for rapid and accurate positioning thereof.

The removable means of the apparatus may include a support member for the template disengageably mounted in fixed position within the aperture in the base, the support member having disengageable fastening means thereon for securing the template thereto. Most desirably, the aperture in the base extends inwardly from one side surface thereof and the support member is a drawer slidably mounted in the aperture. The drawer preferably has an upwardly opening recess in which the template is seated, which provides access to the contour-defining surface from above the base. The carrier member may include a disengageable stylus-mounting fixture and may have an aperture therein through which the stylus projects. In such a case, the aperture in the carrier member is preferably an opening extending inwardly from a side surface thereof, and the fixture is a drawer slidably mounted within the opening in the carrier.

The angularly fixing means of the present apparatus may comprise a handle assembly, and the handle assembly preferably includes an elongated shank extending generally perpendicularly to the parallel planes of the planar upper surface of the base and that in which the carrier member moves. The shank desirably has a relatively large portion of generally rectangular cross section and a gripping portion spaced axially therefrom. An elongated thrust bar has one end attached to one of the base and the carrier member, and the other end thereof mounted on the shank for pivotal movement about an axis perpendicular to the axis thereof and coincident with the greater dimension of the rectangular cross section. A coupling member is attached to the other of the base and carrier member, and the coupling member has a collar portion with a rectangular opening having substantially the same dimensions as the cross section of the large portion of the shank. That portion of the shank is mounted within the collar portion for relative movement, which is essentially limited to sliding along the axis of the shank. Such a handle assembly permits the carrier member and base to be shifted laterally thereby, and fixes them against relative rotation.

The apparatus may additionally include a drilling assembly comprising a base member projecting laterally from the base of the apparatus and disengageably supporting a drilling template in a fixed position thereon, and a plunger mounting member on the carrier member projecting laterally over the base member. A plunger is slidably mounted in the plunger mounting member for reciprocal movement normal to the drilling template and into and out of contact therewith. The drilling template has a plurality of indicia thereon, with which the plunger may register when in contact with the template.

It is particularly preferred that the carrier member of the present apparatus includes a universal assembly comprising a turntable, a first lateral slide member, and a second lateral slide member. The turntable and slide members are assembled with one another in a serially superposed relationship, and they have means for securing them in substantially any of the relative positions attainable in the assemly. The turntable is rotatable relative to the upper surface of the base through an angle of about 360°, the first slide member is laterally slidable relative to the base along a first axis, and the second slide member is laterally slidable relative to the base along a second axis generally perpendicular to the first axis. The turntable and slide members are each movable in planes parallel to the upper surface of the base so that the universal assembly provides means for adjusting the lateral and angular position of a workpiece mounted upon the carrier member in a plane parallel thereto.

Such a universal assembly may include a seating element that has a substantially circular aperture in which the turntable is mounted for rotation relative thereto. The seating element preferably has in its upper surface a circular groove extending adjacent the circular aperture, and a stop block seated in the groove and engageable at any position about the circular aperture. In such a case, the turntable is provided with a stop element projecting over the groove to abut against the stop block, and the angular attitude of the turntable may thereby be readily adjusted by securing the stop block at a given position in the groove and rotating the turntable to cause the stop element to abut against the stop block. Most desirably the universal assembly includes an annular base in which the turntable is mounted for rotation relative thereto and the turntable has a channel of uniform cross section extending diametrically across its upper surface for slidably seating the first lateral slide member. The first slide member has a channel of uniform cross section extending across its upper surface along an axis perpendicular to its own axis of sliding movement for slidably seating the second slide member, the latter having means for mounting a workpiece thereon. Most desirably, the turntable and the first slide member each have elongated clamp members adjacent both sides of the channels extending thereacross, and the clamp members extend over a major portion of the length of their associated channels. Such clamp members are clampable upon the first slide member and second slide member respectively to provide means for securing the slide members in essentially any of the relative positions thereof attainable in assembly. Ideally, the carrier member includes not only a universal assembly, but also a slide plate seated upon the base and a counter rigidly attached thereto and spaced thereabove, as previously described.

BRIEF DESCRIPTION OF THE DRAWINGS

FIG. 4 is a perspective view to a greatly enlarged scale of the handle assembly employed in the apparatus with a portion thereof broken away for clarity of illustration;

FIG. 5 is a plan view of the stationary lower section of the duplicator assembly with portions thereof in section and with the outline of the top wear plate illustrated in phantom line;

FIG. 6 is a fragmentary sectional view of the apparatus along line 6—6 of FIG. 1 showing the upper wear plate and stylus;

FIG. 7 is a fragmentary plan view, in partial section, of duplicator and drilling assemblies of the apparatus of FIG. 1; and FIG. 8 is a plan view of the duplicating apparatus illustrated in FIG. 1, with the drilling assembly thereof fragmentarily illustrated in phantom line, excluding the handle assembly.

DETAILED DESCRIPTION OF THE ILLUSTRATED EMBODIMENTS

Figure 3:
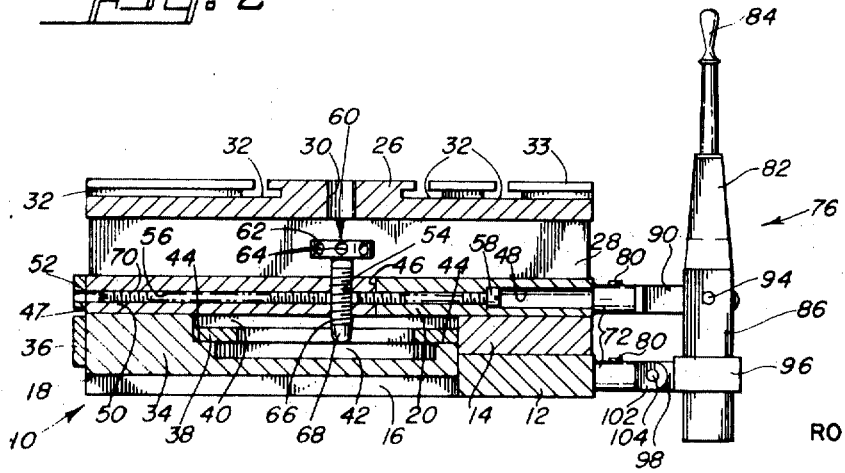
FIG. 3 is a sectional view of the duplicator assembly of the apparatus along the line 3—3 of FIG. 1, with the universal and drilling assemblies removed therefrom.

Turning now in detail to the appended drawings, a duplicator assembly generally designated by the numeral 10 (with particular reference to FIG. 3) is illustrated and includes a base 12 and a bottom wear plate 14 rigidly attached thereto. The base 12 and wear plate 14 together provide a stationary lower section of the duplicator assembly 10 have a common rectangular opening 16 extending rearwardly from the front side 18 thereof. A rectangular top wear plate 20 is slidably supported in surface contact with the upper surface of the bottom wear plate 14; it will be appreciated that, due to sliding contact under considerable loads that occurs therebetween, the wear plates 14, 20 are most desirably fabricated of hard, durable alloys, and that for this reason it is most facile to construct the stationary lower portion of the assembly 10 of two separate elements.

Figure 1:
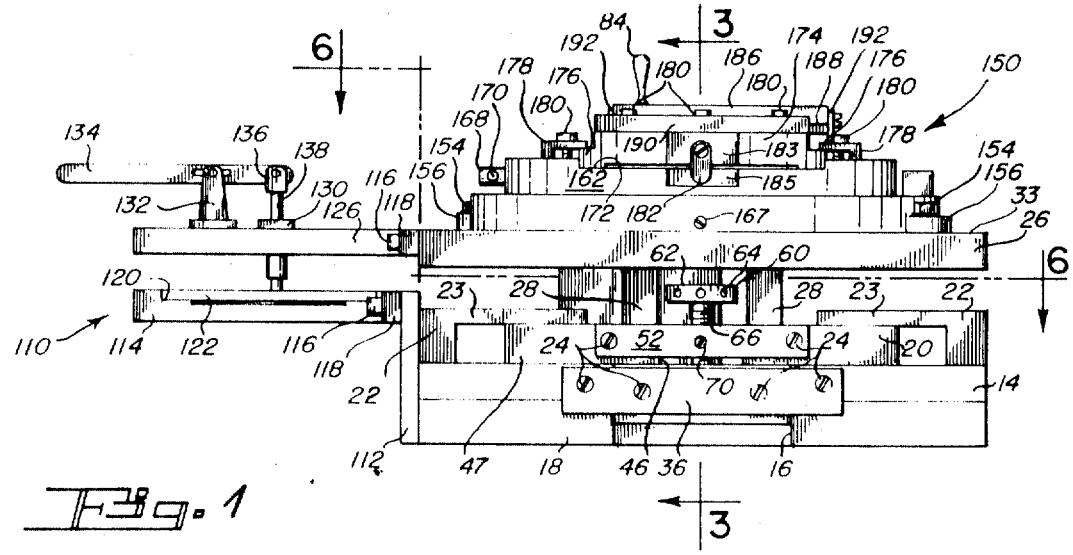
FIG. 1 is an elevational view of duplicating apparatus embodying the present invention.

As is best seen in FIGS. 1 and 5, four L-shaped clamps 22 are secured by screws 24 to the upper surface of the bottom wear plate 14, with a pair thereof adjacent each side and positioned with the long arms 23 thereof extending horizontally over the top wear plate 12. The distance between the long arms 23 and the upper surface of the bottom wear plate 14 is substantially equal to the thickness of the top wear plate 20, so that the L-clamps 22 serve to virtually eliminate movement normal thereto (i.e., vertical movement), and separation of the wear plates 14, 20. A rectangular counter 26 is supported at a distance above the top wear plate 20 by a pair of elongated support columns 28 which extend from the front to the rear of the assembly 10. A centering hole 30 is provided through the counter 26 to provide means for readily centering the counter 26 and parts attached thereto relative to the stationary bottom elements. The counter 26 is also provided with a plurality of T-slots 32 which are arranged in its upper surface 33 in a suitable pattern for convenient clamping of various members thereupon.

A drawer consisting of a narrow body 34 and a front fastening plate 36 is seated in the rectangular opening 16 of the base 12 and wear plate 14, and is secured therein by screws 24 inserted through the front plate 36 and threaded into the bottom wear plate 14 at the front side 18 thereof. The narrow body 34 supports a template 38 which has a internal contour 40 which is to be copied, and the template 38 is seated over a depression 42 in the body 34 and on shoulders 44 at the ends thereof, such as by screws 24. The top wear plate 20 has a rectangular opening 46 similar to opening 16, which extends rearwardly from its front side 47, and a counterbored threaded passageway 48 extends between the rectangular opening 46 and the rear edge of the plate 20. A stylus holder consisting of a slide element 50 and a front fastening plate 52 is received in the opening 46 and is secured at the front by screws 24 inserted through the plate 52 and tightened into the top wear plate 20 at the front side 47 thereof. The slide element 50 has a threaded aperture 54 normal to the plane thereof, and it has an elongated threaded passageway 56 extending therethrough, parallel to the plane thereof and into the aperture 54. A long bolt 58 is threadably received in the passageway 48, and the forward end thereof engages the rear portion (behind the aperture 54) of the passageway 56 to secure the rear of the slide element 50 and assist in maintaining the stylus holder in a fixed position in the top wear plate 20.

A stylus, generally designated by the numeral 60, has a threaded shank 66 with an enlarged head 62 and a tapered tip on opposite ends thereof. The stylus 60 is threaded downwardly into the aperture 54 so that the head 62 extends above the upper surface of the top wear plate 20 and the tip 68 projects therebelow, and it is vertically adjustable by turning it in the aperture 54. A multiplicity of small radial holes 64 are provided in the head 62 to facilitate turning of the stylus 60 by an elongaged element (not shown), such as may be necessary (if adjustment is to be made without removal of the slide element 50), due to the relatively inaccessible position of the stylus 60 between the elongated support columns 28. It will be appreciated that the stylus 60 is designed to extend into the template 38, and that the top wear plate 20 may be moved to duplicate the pattern thereof by following the internal contour 40 with the tip 68 thereof. The slight taper of the tip 68 may be used to compensate for any wear of the cutting tool (not shown) that may occur after extended use and to permit some variation in the dimensions of the part being produced (not shown) as compared to the contour 40 of template 38. To ensure maximum accuracy, a bolt 70 is threadably received in the front portion of the passageway 56 in the slide element 50 for tightening against the shank 66 of the stylus 60 to avoid undesirable rotation (and hence vertical misalignment) thereof.

Cylindrical bosses 72 project rearwardly from both the top wear plate 20 and the base 12, and (as is best seen in FIG. 4 wherein the bosses 72 are shown in phantom line) they receive studs 74 provided on the handle assembly, generally designated by the numeral 76, inserted axially into them. Each of the studs 74 has a circumferential groove 78 engaging a set screw 80, which is threaded radially through the sidewall of each of the associated bosses 72 to secure the studs 74 therein while permitting limited rotational movement therebetween. The handle assembly 76 includes an elongated shank 82 with a gripping portion 84 at the upper end and an enlarged rectangular portion 86 at the lower end thereof. A rectangular slot 88 is provided through the upper section of the rectangular portion 86 at a centralized location thereon, and one end of a thrust bar 90 is received in the slot 88. The forward end of the thrust bar 90 carries the upper one of the studs 74, and the inserted end has an aperture 92 through which is secured a pivot pin 94. The pivot pin 94 is inserted transversely through the slot 88 in the rectangular portion 86 along an axis perpendicular to the axis of the shank 82 and coincident with the greater cross sectional dimension, and passes through the aperture 92 in the thrust bar 90 to fix the latter in the slot 88 for limited pivotal movement. A rectangular collar 96 has an inside configuration closely conforming to the outside configuration of the enlarged portion 86 of the handle assembly 76, and is slidably mounted thereon in a position below the slot 88. The collar 96 has an outwardly projecting flange 98 which is inserted between the ears 100 of a U-shaped element 102, on which is carried the lower stud 74. A short pivot pin 104 is inserted through apertures provided in the ears 100 and the flange 98 to secure the flange 98 for pivotal movement in the element 102.

To use the duplicator assembly, it is first secured upon the bed of a vertical milling machine or the like and initially set up by inserting the spindle of the milling machine into the centering hole 30. Since the hole 30 is aligned over the stylus 60, the correct relationships are automatically achieved between the stylus 60 and the machine tool (not shown). Thereafter, the workpiece is fastened against the upper surface 33 of the rectangular top plate 26, which may be achieved with suitable clamps (not shown) engaged in the T-slots 32, and a template 38 having a contour 40 which is to be reproduced on the workpiece is fixed in the narrow body 34 of the drawer, which is then secured in the rectangular opening 16. The stylus 60 is adjusted so that the tip 68 thereof will bear upon the contour 40 of the template 38, and it is locked in that position by tightening the bolt 70. Thereupon, the workpiece can be moved in a pattern corresponding to the contour 40 by movement of the handle assembly 76, which serves to shift the top wear plate 20, stylus 60 and counter 26 relative to the base 12, bottom wear plate 14 and template 38. The use of a handle assembly having an enlarged rectangular portion 86 of the sort illustrated minimizes imprecision resulting from relative movement between it and the rectangular collar 96, and greatly facilitates maintaining the counter 26 against relative rotation.

The position of the template directly beneath the workpiece is of considerable advantage because it improves the precision of the machining operation and simplifies the setting up procedure. Also, due to their relative size and configuration, it is important that the template rather than the stylus be stationarily mounted in the base portion of the machine, because improved support against movement and distortion can be achieved thereby. It will be appreciated that the duplicating assembly can include auxiliary elements to facilitate operation, such as locking pins, additional templates, etc. Such pins can be employed to affix the top wear plate 20 to the bottom wear plate 14 to allow initial rough drilling and machining operations to be carried out. Additional templates may be used to combine two or more patterns, and if desired a template having vertical elements may be used, such as by securing it to the upper surface 33 of the counter 26. So positioned, an auxiliary template of that type can impart a vertical movement to a spring loaded milling tool having appropriate means the following the contour thereof.

In a preferred embodiment of the invention a drilling assembly, generally designated by the numeral 110 is secured to the duplicator assembly 10 for employment therewith. The drilling assembly 110 comprises a vertical bracket 112 mounted on the side of the base 12 and bottom wear plate 14, which supports a drilling base 114 with bolts 116 engaged through the flanges 118 thereof. The base 114 has a recess 120 in its upper surface, over which is seated a drilling template 122 which has a multiplicity of center drilled holes 124 and which is secured therein by screws 24 (the latter features being most clearly illustrated in FIG. 7). A table 126 is secured to the rectangular top plate 26 by bolts 116 through the flanges 118 thereof, and it projects outwardly over the drilling base 114 and in a plane parallel thereto. The table 126 has a centrally located aperture 128 in which is inserted a hardened wear bushing 130, and a pedestal 132 is mounted on the upper surface of the table 126 adjacent the aperture 128. Pivotally supported in the upper end of the pedestal 132 is a lever 134, to one end of which is in turn pivotally connected a plunger assembly 136, including a plunger 138 that is slidably received in the passage through the bushing 130. The lever 134 may be biased by means not shown, such as by a spring in the upper end of the pedestal 132, to maintain the plunger 138 in the center drilled holes 124 of the template 122 when desired.

The drilling assembly 110 can be employed in conjunction with the duplicating assembly 10 to provide locating holes, such as may be desirable at bends or corners or as a starting location for a duplicating operation. Alternatively, the assembly can be used in conjunction with a drill press or the like to simply reproduce a series of holes in a workpiece in a predetermined pattern. Operation of the device should be quite apparent, and involves moving the table 126 relative to the drilling base 114 by sequentially raising and lowering the plunger 138 to locate it in the center-drilled holes 124. In each location the cutting tool is used to produce holes in the workpiece, and the workpiece may be mounted directly on the upper surface 33 of the counter 26 in the manner hereinbefore described.

Figure 2:
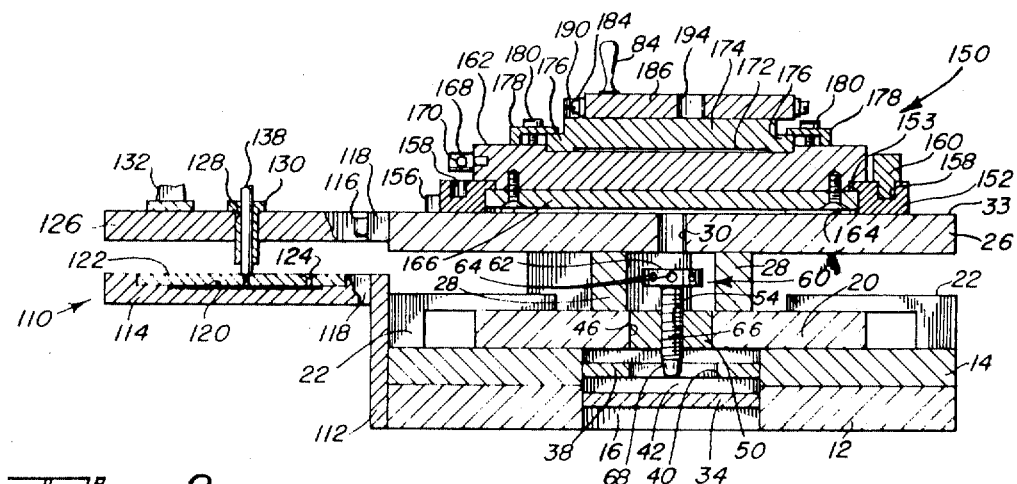
FIG. 2 is a vertical section view of the apparatus illustrated in FIG. 1.

A particularly preferred embodiment of the invention utilizes a universal assembly, generally designated by the numeral 150, mounted upon the counter 26. The universal assembly 150 is best illustrated in FIGS. 1, 2 and 8, and includes an annular base 152 which has a circumferential shoulder 153 that projects inwardly from the upper edge thereof. The annular base 152 is secured on the upper surface 33 of the top plate 26 by T-bolts 154, which are inserted through ears 156 projecting outwardly from the annular base 152, the T-bolts 154 being received in the T-slots 32 provided in the counter 26. The annular base 152 also has a circumferential groove 158 in its upper surface, in which travels a stop-block assembly 160 which has means (not illustrated) for fixing it at any position in the groove 158. A circular turntable 162 is mounted in the circular passageway 164 provided through the annular base 152 and is retained therein against axial movement by bottoms plate 166, which is secured against the bottom of the turntable 162 and engaged under the shoulder 153; a locking screw 167 (shown in FIG. 1) is furnished in the base 152 to maintain the turntable 162 in the desired angular position by tightening it thereagainst. A post 168 projects radially outwardly from the turntable 162 and threadably supports an adjustable stud 170 in a passageway thereof, with the stud 170 projecting from the sides of the post 168. The stop-block assembly 160, the post 168 and the stud 170 cooperate to permit facile angular positioning of the turntable 162 relative to the annular base 152, and the threaded stud 170 permits a fine adjustment of the position.

The upper surface of the turntable 162 has a relatively wide transverse channel 172 thereacross, in which is seated a generally rectangular lower cross slide plate 174. The cross slide plate 174 has parallel shoulders 176 at the bottom edge and along opposite sides thereof, and the turntable 162 has a corresponding pair of elongated L-shaped clamps 178 extending adjacent the margins of the channel 172. The L-shaped clamps 178 project over the channel 172 from opposite sides thereof, and they extend along the major portion of its length. Screws 180 are provided for tightening the clamps 178 upon the shoulders 176 of the cross slide plate 174 to maintain the plate 174 in any position therealong, and the purpose of utilizing elongated clamps 178 is to permit the cross slide plate 174 to be securely fixed in positions wherein a considerable portion thereof projects beyond the outer edge of the turntable 162, thus extending the scope and versatility of the apparatus. The cross slide plate 174 has swing-away stops 182 attached on flattened areas 183 at its ends, and these stops may advantageously be used in connection with size blocks (not shown) by inserting such blocks between the stop 182 and the corresponding flattened areas 185 on the turntable 162 for accurate and facile adjustment; they can also be used in initially setting up the apparatus to rapidly and easily attain a centered position.

The lower cross slide plate 174 has in its upper surface a relatively wide transverse channel 184 which extends perpendicular to its sides, and in which is slidably seated an upper cross slide plate 186. The upper cross slide plate 186 is similar in design to the lower cross slide plate 174 and has a pair of parallel shoulders 188 at its bottom edge along opposite sides thereof. L-shaped clamps 190 similar to clamps 178 are provided adjacent the margins of the channel 184, and they have screws 180 for tightening the clamps 190 upon the shoulders 188 of the upper cross slide plate 186. The latter is also provided with swing-away stops 192 on the ends thereof, which may be employed in the manner described with reference to swing-away stops 182. In addition, the upper cross slide plate 186 has a centering hole 194 (similar to the centering hole 30 in the rectangular counter 26 of the duplicator assembly 10) and it has a multiplicity of clamp holes 196 by which a workpiece may suitably be secured thereupon.

The universal assembly 150 can be readily set up and used to further enhance the benefits of the basic duplicator assembly 10, such as by increasing the flexibility and scope of utility thereof. It may be employed to produce complex parts with relative ease, and to fabricate the templates employed in the duplicator assembly 10 itself. Although not illustrated, the various parts of the universal assembly 150 (and other elements of the overall device where appropriate) may be provided with scales, indicators, scribe lines, and the like to facilitate the setting of desired distances and angles, without need for independent measurement thereof.

Thus, it can be seen that the present invention provides a novel apparatus for use in machining operations for the duplication of dies, molds, machine parts and the like. It is relatively inexpensive to manufacture, simple to set up and operate, accurate, and highly flexible in its applications. The apparatus may include novel subassembly components which improve speed and accuracy, simplify the production of complex parts, and increase the flexibility and scope of utility thereof.

I claim:

1. Apparatus for pattern copying comprising a base having a planar upper surface with an aperture therein and removable means for mounting a pattern template having a surface defining a contour for copying mounted within said base with said contour-defining surface being exposed through said aperture in said upper surface of said base; a carrier member having a planar bottom surface slidably supported upon said planar upper surface of said base for universal movement of said carrier member thereover in a plane parallel thereto; restricting means on said base extending over said base and said carrier member to prevent substantial movement of said carrier member normally outwardly from said base; angular fixing means on said base and carrier member substantially fixing said carrier member against rotation relative to said base in said parallel plane; a stylus mounted on said carrier member with one end thereof projecting below said bottom surface of said carrier member and into said aperture in said base member upper surface for contact with said contour-defining surface of said template; and means on said carrier member for rigidly mounting a separable element thereon for movement of the element in a pattern corresponding to said contour by movement of said carrier member with said stylus bearing against said contour-defining surface to follow said contour.

2. The apparatus of claim 1 wherein said carrier member includes a slide plate seated upon said base and a counter rigidly attached to said slide plate and spaced thereabove, said counter having a planar top surface extending in a plane parallel to said planar upper surface of said base and said slide plate providing said planar bottom surface of said carrier member, said stylus being mounted on and extending through said slide plate.

3. The apparatus of claim 1 wherein said top surface of said counter has a plurality of slots and a recess formed therein, said slots providing said mounting means on said carrier member and said recess being axially aligned with said stylus to provide means for rapid and accurate positioning thereof.

4. The apparatus of claim 1 wherein said removable means includes a support member for said template disengageably mounted in fixed position within said aperture in said base, said support member having disengageable fastening means thereon for securing said template thereto.

5. The apparatus of claim 4 wherein said aperture in said base extends inwardly from one side surface thereof, and wherein said support member is a drawer slidably mounted in said aperture, said drawer having an upwardly opening recess in which said template is seated and providing access to said contour-defining surface from above said base.

6. The apparatus of claim 1 wherein said carrier member includes a disengageable stylus-mounting fixture and has an aperture therein through which said stylus projects.

7. The apparatus of claim 6 wherein said aperture in said carrier member is an opening extending inwardly from a side surface thereof, and wherein said fixture is a drawer slidably mounted within said opening in said carrier.

8. The apparatus of claim 1 wherein said angularly fixing means comprises a handle assembly.

9. The apparatus of claim 8 wherein said handle assembly includes an elongated shank extending generally perpendicularly to said parallel planes, with a relatively large portion of generally rectangular cross section and a gripping portion spaced axially therefrom; an elongated thrust bar having one end attached to one of said base and carrier member and the other end mounted on said shank for pivotal movement about an axis perpendicular to the axis thereof and coincident with the greater dimension of said rectangular cross section; and a coupling member attached to the other of said base and carrier member and having a collar portion with a rectangular opening having substantially the same dimensions as the cross section of said large portion of said shank, said large portion being mounted within said collar portion for relative movement essentially limited to sliding along the axis of said shank, whereby said carrier member and base may be shifted laterally by said handle assembly and fixed against relative rotation thereby.

10. The apparatus of claim 1 additionally including a drilling assembly comprising a base member projecting laterally from said base and disengageably supporting a drilling template in a fixed position thereon, and a plunger mounting member on said carrier member projecting laterally over said base member and slidably mounting a plunger for reciprocal movement normal to said drilling template into and out of contact therewith, said drilling template having a plurality of indicia thereon with which said plunger may register when in contact therewith.

11. The apparatus of claim 1 wherein said carrier member includes a universal assembly comprising a turntable, a first lateral slide member, and a second lateral slide member, said turntable, first slide member and second slide member being assembled with one another in a serially superposed relationship, and having means for securing them in substantially any relative positions attainable in said assembly, said turntable being rotatable relative to the upper surface of said base through an angle of about 360°, said first slide member being laterally slidable relative to said base along a first axis, and said second slide member being laterally slidable relative to said base along a second axis generally perpendicular to said first axis, said turntable and slide members each being movable in planes parallel to the upper surface of said base so that said universal assembly provides means for adjusting the lateral and angular position of a workpiece mounted upon said carrier member in a plane parallel thereto.

12. The apparatus of claim 11 wherein said universal assembly includes a seating element having a substantially circular aperture in which said turntable is mounted for relative rotation, and wherein said seating element has in its upper surface a circular groove extending adjacent said circular aperture, said assembly additionally including a stop block seated in said groove and engageable at any position about said circular aperture, said turntable having a stop element projecting over said groove to abut against said stop block so that the angular attitude of said turntable may be readily adjusted by securing said stop block at a given position in said groove and rotating said turntable to cause said stop element to abut thereagainst.

13. The apparatus of claim 11 wherein said universal assembly includes an annular base in which said turntable is mounted for rotation relative thereto, wherein said turntable has a channel of uniform cross section extending diametrically across its upper surface for slidably seating said first lateral slide member, and wherein said first slide member has a channel of uniform cross section extending across its upper surface along an axis perpendicular to its own axis of sliding movement for slidably seating said second slide member, said second slide member having means for mounting a workpiece thereon.

14. The apparatus of claim 13 wherein said turntable and first slide member each have elongated clamp members adjacent both sides of the channels extending thereacross, said clamp members extending over a major portion of the length of their associated channels and being clampable upon said first slide member and second slide member respectively to provide said means for securing said slide members in such relative positions.

15. The apparatus of claim 13 wherein said carrier member includes a slide plate seated upon said base and a counter rigidly attached to said slide plate and spaced thereabove, said counter having a planar top surface extending in a plane parallel to said planar upper surface of said base and said slide plate providing said planar bottom surface of said carrier member, said stylus being mounted on and extending through said slide plate, said annular base having means for mounting upon said planar top surface of said counter.

References Cited

UNITED STATES PATENTS

| | | | |
|---|---|---|---|
| 3,126,768 | 3/1964 | Gondek | 77—64 |
| 3,209,623 | 10/1965 | Schardt | 77—64 |
| 3,463,049 | 8/1969 | Thomson | 90—13 |

GIL WEIDENFELD, Primary Examiner

U.S. Cl. X.R.

90—58 R, 58.3; 408—69